United States Patent
Holgers et al.

(10) Patent No.: US 9,789,782 B2
(45) Date of Patent: Oct. 17, 2017

(54) BATTERY MODULE DISCONNECT ARRANGEMENT

(71) Applicant: Autoliv Development AB, Vårgårda (SE)

(72) Inventors: Alf Holgers, Alingsas (SE); Christian Cavell, Planegg (DE); David Sturk, Göteborg (SE); Magnus Berner, Vänersborg (SE); Lars Hoffman, Brålanda (SE); Per Gustafsson, Vårgårda (SE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/895,014

(22) PCT Filed: Jun. 3, 2014

(86) PCT No.: PCT/SE2014/050673
§ 371 (c)(1),
(2) Date: Dec. 1, 2015

(87) PCT Pub. No.: WO2014/196917
PCT Pub. Date: Dec. 11, 2014

(65) Prior Publication Data
US 2016/0114695 A1     Apr. 28, 2016

(30) Foreign Application Priority Data
Jun. 7, 2013 (EP) ..................... 13171050

(51) Int. Cl.
*B60L 9/00* (2006.01)
*B60L 11/00* (2006.01)
(Continued)

(52) U.S. Cl.
CPC ......... *B60L 11/1851* (2013.01); *B60L 3/0046* (2013.01); *B60L 3/04* (2013.01);
(Continued)

(58) Field of Classification Search
CPC ...... B60L 3/0046; B60L 3/04; B60L 11/1861; H01H 37/761; H01H 39/004;
(Continued)

(56) References Cited

U.S. PATENT DOCUMENTS 5,877,563 A     3/1999 Krappel et al.
6,090,501 A *   7/2000 Souliac ............... H01H 39/006
                                                429/61
(Continued)

FOREIGN PATENT DOCUMENTS

DE         4406730 A1      9/1995
DE    WO 2011095630 A1 *  8/2011    ........ H01M 10/4207
(Continued)

OTHER PUBLICATIONS

International Search Report and Written Opinion of the ISA, ISA/SE, Stockholm, mailed Sep. 12, 2014.

*Primary Examiner* — Maceeh Anwari
(74) *Attorney, Agent, or Firm* — Stephen T. Olson; Harness, Dickey & Pierce, P.L.C.

(57) ABSTRACT

The arrangement for disconnecting at least one of a plurality of battery modules in an automotive battery comprises a device arranged to detect that at least one battery module is to be disconnected, and a bypass switch arranged at each battery module, wherein the bypass switch arranged at the detected at least one battery module is controllable to bypass the at least one detected battery module via a bypass path. The arrangement further comprises a disconnect switch arranged at each battery module, wherein the disconnect switch arranged at the at least one bypassed battery module (Continued)

is controllable to disconnect the at least one detected battery module from remaining battery modules, either simultaneously as, or after, the bypassing of the detected battery module.

22 Claims, 10 Drawing Sheets

(51) Int. Cl.
    *G05D 1/00*     (2006.01)
    *G05D 3/00*     (2006.01)
    *G06F 7/00*     (2006.01)
    *G06F 17/00*     (2006.01)
    *B60L 11/18*     (2006.01)
    *B60L 3/00*     (2006.01)
    *B60L 3/04*     (2006.01)
    *H01M 10/48*     (2006.01)
    *H01M 2/20*     (2006.01)
    *H01H 37/76*     (2006.01)
    *H02J 7/00*     (2006.01)
    *H01H 39/00*     (2006.01)

(52) U.S. Cl.
    CPC ........ *B60L 11/1861* (2013.01); *H01H 37/761* (2013.01); *H01H 39/004* (2013.01); *H01H 39/006* (2013.01); *H01M 2/206* (2013.01); *H01M 10/48* (2013.01); *H02J 7/0016* (2013.01); *H02J 7/0026* (2013.01); *B60L 2240/545* (2013.01); *B60L 2240/547* (2013.01); *B60L 2240/549* (2013.01); *B60L 2250/16* (2013.01); *H01H 2039/008* (2013.01); *H01M 2220/20* (2013.01); *Y02T 10/7005* (2013.01); *Y02T 10/705* (2013.01); *Y02T 10/7044* (2013.01); *Y10S 903/907* (2013.01)

(58) Field of Classification Search
    CPC .... H01H 39/006; H01M 2/206; H01M 10/48; H02J 7/0016; H02J 7/0026
    USPC .......................................................... 701/22
    See application file for complete search history.

(56) References Cited

U.S. PATENT DOCUMENTS

| | | | |
|---|---|---|---|
| 6,843,157 | B2 | 1/2005 | Hamilton et al. |
| 6,946,608 | B2 | 9/2005 | Brede et al. |
| 7,498,531 | B2 | 3/2009 | Knauss et al. |
| 7,745,745 | B2 | 6/2010 | Kordel et al. |
| 2007/0009786 | A1 | 1/2007 | Hold et al. |
| 2010/0305792 | A1 | 12/2010 | Wilk et al. |
| 2010/0328014 | A1 | 12/2010 | Suzuki et al. |
| 2012/0091964 | A1 | 4/2012 | Vance et al. |
| 2012/0248881 | A1 | 10/2012 | Chang et al. |
| 2012/0313560 | A1 | 12/2012 | Hambitzer et al. |
| 2013/0022851 | A1 | 1/2013 | De Oliveira |
| 2013/0214896 | A1 | 8/2013 | Josifovic et al. |

FOREIGN PATENT DOCUMENTS

| | | |
|---|---|---|
| DE | 102010015239 A1 | 10/2011 |
| GB | 2341985 A | 3/2000 |
| WO | 2009/106394 A1 | 9/2009 |
| WO | WO-2013/064203 A1 | 5/2013 |

\* cited by examiner

BATTERY MODULE DISCONNECT ARRANGEMENT

CROSS-REFERENCE TO RELATED APPLICATIONS

This application is a 371 U.S. National Stage of International Application No. PCT/SE2014/050673, filed Jun. 3, 2014. This application claims the benefit of and priority to European Patent Application No. 13171050.1, filed Jun. 7, 2014. The disclosures of the above applications are incorporated herein by reference.

TECHNICAL FIELD

The invention relates to a method and an arrangement for disconnecting one or more battery modules in an automotive battery.

BACKGROUND

An automotive battery for use in a motor vehicle may cause great damages to the motor vehicle in which the battery is situated in case of battery failure. This is particularly evident in the case of a vehicle crash or accident where severe vehicle damages and even passenger injuries may arise due to high magnitude short-cut currents causing vehicle fire. Further damaging battery failure situations include high-magnitude currents in surrounding conducting structures of the vehicle, e.g. short-cut currents, forming of gas in Lithium-ion batteries and damaged mechanical and/or electronic components which in its turn could cause vehicle breakdown and ultimately a vehicle crash.

International patent application WO 2009/106394 discloses a battery pack for use in a motor vehicle having a plurality of battery modules which individually can be disconnected and/or bridged in the event of a fault in one or more of the battery modules, in order to make it possible to preclude a destructive chain reaction within a battery pack.

A further problem that may arise in prior art automotive batteries is that a faulty battery module may cause high short-cut currents and arcing may occur between conductors in the automotive battery causing damages and even fires.

SUMMARY

An objective of the present invention is to solve or at least mitigate the problem of arcing and to provide an improved arrangement for disconnecting one or more battery modules in an automotive battery.

This objective is attained in a first aspect of the invention by a method of disconnecting at least one of a plurality of battery modules in an automotive battery. The method comprises the steps of detecting that said at least one battery module is to be disconnected, bypassing the at least one detected battery module and disconnecting the at least one detected battery module from remaining battery modules comprised in the automotive battery no earlier than simultaneously as the bypassing.

This objective is attained in a second aspect of the invention by an arrangement for disconnecting at least one of a plurality of battery modules in an automotive battery. The arrangement comprises a device arranged to detect that said at least one battery module is to be disconnected, and a bypass switch arranged at each battery module, wherein the bypass switch arranged at the detected at least one battery module is controllable to bypass the at least one detected battery module via a bypass path. The arrangement further comprises a disconnect switch arranged at each battery module, wherein the disconnect switch arranged at the at least one bypassed battery module is controllable to disconnect the at least one detected battery module from remaining battery modules no earlier than simultaneously as the bypassing.

Thus, each battery module in the automotive battery can be individually bypassed and disconnected upon selection by means of control of the bypass switch and the disconnect switch that are arranged at each battery module. During operation of the automotive battery arranged in an electric or hybrid motor vehicle, each battery module delivers power to a load in the form of an electric motor, i.e. an inductive load. In case it is detected, for example by an electronic control unit (ECU) of the motor vehicle, that one or more battery modules should be disconnected, either due to a fault or if reduced performance of the battery is desired, the bypass switch(es) arranged at the module(s) to be disconnected are controlled to close a bypass path via which the detected module is bypassed and simultaneously or subsequently, the disconnect switch(es) arranged at the module(s) to be disconnected are controlled to disconnect the detected module (s) from the remaining battery modules in the automotive battery. It should be noted that it may be desirable to disconnect one or more battery modules for prophylactic reasons, for instance if the ECU receive an indication that there is a risk that a fault for some reason is to occur, even if the indicated fault subsequently does not occur. Moreover, if one or more battery modules are disconnected, electric imbalance may arise in the battery, leading to a need for disconnection of further (functioning) battery modules to attain electric balance.

In a practical example, an automotive battery delivers 300 V to the electric motor by serially connecting five battery modules each delivering 60 V. In normal operation, the voltage provided by the battery will be induced in the inductive element and cause a current to flow. If one or more battery modules are disconnected from the battery, the inductive load (i.e. the electric motor) will attempt to maintain the same current since an inductor to its nature resists any changes in current. A decrease in inductor current resulting from disconnected battery module(s) will result in a voltage over the inductor opposing the decrease in inductor current. This rise in voltage may be very steep since $U=L*dI/dt$, where U denotes the voltage across the inductor, L is the inductance, and I is the current flowing through the inductor, and cause a so called inductive kick-back. When the battery module is disconnected, a parasitic capacitance in the switching mechanism at the battery module performing the disconnection may be charged by a very high voltage, potentially causing a flow of current to arc between the two terminals of the switching mechanism in the battery with resulting damage of various components and even fire in the vehicle.

Therefore, according to the invention, the detected battery module is first bypassed and thereafter, the bypassed module is disconnected from the remaining battery modules in the automotive battery, or the bypassing and disconnecting of the detected battery module is undertaken simultaneously. The bypassing of the detected battery module will have the kickback-current of the electric motor flow via the bypass path, and disconnection can be performed without the risk of causing arcing, thereby greatly improving the robustness of the battery. Further advantageous is that limited operation of the battery is provided such that a driver of the motor vehicle is given an opportunity to move her vehicle from a busy stretch of road or even drive the vehicle to a workshop.

The disconnection of one or more battery modules can in an embodiment of the present invention be indicated to a driver of the vehicle via information presented on the control panel of the vehicle.

If required, all battery modules can be instantly bypassed and disconnected, or the modules can be bypassed and disconnected one by one in a sequence, in case of a situation as e.g. a severe car accident in order to prevent the battery or surrounding equipment from catching fire.

In an embodiment of the present invention, the arrangement further comprises a discharge switch and an energy draining device in the form of e.g. a resistor arranged at each battery module. The discharge switch arranged at the battery module to be disconnected is controllable to couple the disconnected battery module to the energy draining device such that the module is discharged either simultaneously as, or after, the disconnection of the same. Advantageously, a faulty battery module can be discharged in a lenient manner to avoid any further damage.

In a further embodiment of the present invention, the arrangement further comprises means arranged at each battery module for sensing a current in the bypass path of one or more bypassed battery modules subsequently to be disconnected. The means for sensing a current is arranged to control the disconnect switch to disconnect the at least one bypassed battery module when the current in the bypass path has reached a predetermined threshold level. Thus, by dimensioning the sensing device such that it reacts when a predetermined threshold current level has been reached, an automated disconnection mechanism is advantageously provided.

In an alternative embodiment, the current sensing means are arranged at a terminal of the respective battery module and connected to the bypass switch of the respective battery module for controlling the bypass switch. As soon as the means senses that the current at a terminal (e.g. the positive terminal) of the battery module reaches a predetermined level, it will respond accordingly and control the bypass switch to bypass the battery module via the bypass path. Thus, in this particular embodiment, the respective current sensing means will advantageously act as a device for detecting that a battery module is to be disconnected.

In a further embodiment, each of the current sensing means is coupled to the respective disconnect switch for activating the disconnect switch. When the current sensing means senses that the current at the positive terminal of the battery module reaches the predetermined level, it will respond by controlling the disconnect switch to disconnect the battery module from the main power supply line of the automotive battery either simultaneously as, or after, the bypass switch has been controlled by the current sensing means to bypass the battery module via the bypass path.

In still a further embodiment, each of the current sensing means is coupled to the respective discharge switch for activating the discharge switch simultaneously as, or after, activation of the disconnect switch. Thus, the current sensing means will further control discharge of the battery module via the discharge switch to the energy draining device when the current sensing means senses an overcurrent at a terminal of the battery module.

An advantage of having the respective current sensing means control detection, bypass, disconnection and even discharge of the respective battery module is that an ECU strictly not is required in the arrangement of the present invention. By using passive components (and not having to included a component such as a microprocessor), the arrangement for disconnecting one or more battery modules becomes inexpensive and less complex. Moreover, the arrangement will be easier to implement inside the automotive battery with passive components.

The current sensing device is in an embodiment realized by means of a coil arranged in the bypass path and connected to the disconnect switch for controlling the disconnect switch. Thus, as soon as the coil senses that the short-circuit current through the bypass path reaches a predetermined level, it will respond accordingly and control the disconnect switch to disconnect the bypassed battery module. Advantageously, this detection of current and triggering of the disconnect switch is autonomous.

In an alternative embodiment, the current sensing device is realized by means of a current shunt arranged in the bypass path for measuring the current in the bypass path. In this embodiment, the ECU would typically be used for determining the current and controlling the disconnect switch. Further alternatives for sensing the current in the bypass path are Hall elements or piezoelectric sensors.

Moreover, it is possible to detect a noise level of the current and thus determine a characteristic of the current, i.e. magnitude and/or frequency of the current.

In a further alternative, in case e.g. an ECU is used for controlling the switches of the arrangement, the ECU could control the disconnect switch(es) to disconnect the bypassed battery module(s) after a certain time has elapsed from the moment of bypassing the modules, such as e.g. 1 ms or more. A vehicle may contain a great number of interconnected ECUs for controlling all properties of the vehicle such as a brake control module (BCM) or a speed control module (SCM). The vehicle could even comprise a particular crash ECU receiving information from an battery monitoring unit (BMU), which detects various physical properties of the battery such as voltage, current, temperature, state of charge (SOC) etc., for management of the battery.

In a further embodiment of the present invention, the disconnecting switches are realized by means of pyrotechnical switches arranged to disconnect the battery modules upon ignition. When a pyrotechnical charge is ignited, a conducting path between the battery module and the main power delivery line of the automotive battery is removed, hence disconnecting the battery module from the remaining battery modules in the automotive battery. An advantage of using a pyro switch as compared to for instance fuses is that switching time is independent of the passing current, which implies instant switching.

In yet further embodiments of the present invention, the bypass switches and/or the discharge switches are realized by means of pyrotechnical switches arranged to cause a movable bridging element arranged at the pyrotechnical element of the respective type of switch to move to a position for closing a conductive path. Upon ignition of a pyrotechnical charge, the bridging element will move to the closed position, which (a) for the bypass switch means that the bridging element closes the bypass path to the main power delivery line of the automotive battery, and (b) for the discharging switch means that the bridging element closes a circuit between the battery module and the energy draining device.

The object of the present invention is further attained in a third aspect of the present invention by an arrangement for disconnecting all battery modules in an automotive battery. The arrangement comprises a device arranged to detect that the battery modules are to be disconnected, a bypass switch arranged at the automotive battery controllable to bypass the battery modules via a bypass path, and a disconnect switch arranged at each battery module. The disconnect switch is arranged at the respective battery module and is controllable to disconnect the respective battery module from a main power delivery line of the automotive battery either simultaneously as, or after, bypassing is/has been performed. Hence, the disconnection is performed no earlier than simultaneously as the bypassing.

In case the battery modules only are to be disconnected in case of a more severe accident, thus warranting instant disconnection of all battery modules, the arrangement of the third aspect is advantageous in that only a single bypass switch is required for instantly bypassing all battery modules via the bypass path. After, or simultaneously as, the bypassing of the battery modules has been undertaken the disconnect switches are controlled to disconnect all battery modules. With this particular arrangement, the risk of having any undesired current generated e.g. when towing the vehicle can be eliminated.

The object of the present invention is further attained in a fourth aspect of the present invention by an arrangement for disconnecting all battery modules in an automotive battery. The arrangement comprises a device arranged to detect that the battery modules are to be disconnected, and a bypass switch arranged at the automotive battery controllable to bypass the battery modules via a bypass path. The arrangement further comprises a disconnect switch arranged in a main power delivery line of the automotive battery, the disconnect switch being controllable to disconnect the battery modules from the bypass path no earlier than simultaneously as the bypassing of the battery modules.

In case the battery modules only are to be disconnected in case of a more severe accident, thus warranting instant disconnection of all battery modules, the arrangement of the fourth aspect is advantageous in that only a single bypass switch is required for instantly bypassing all battery modules via the bypass path. After, or simultaneously as, the bypassing of the battery modules has been undertaken the single disconnect switch is controlled to disconnect all battery modules. With this particular arrangement, the risk of having any undesired current generated e.g. when towing the vehicle can be eliminated. Further, a minimum number of switches are advantageously utilized.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
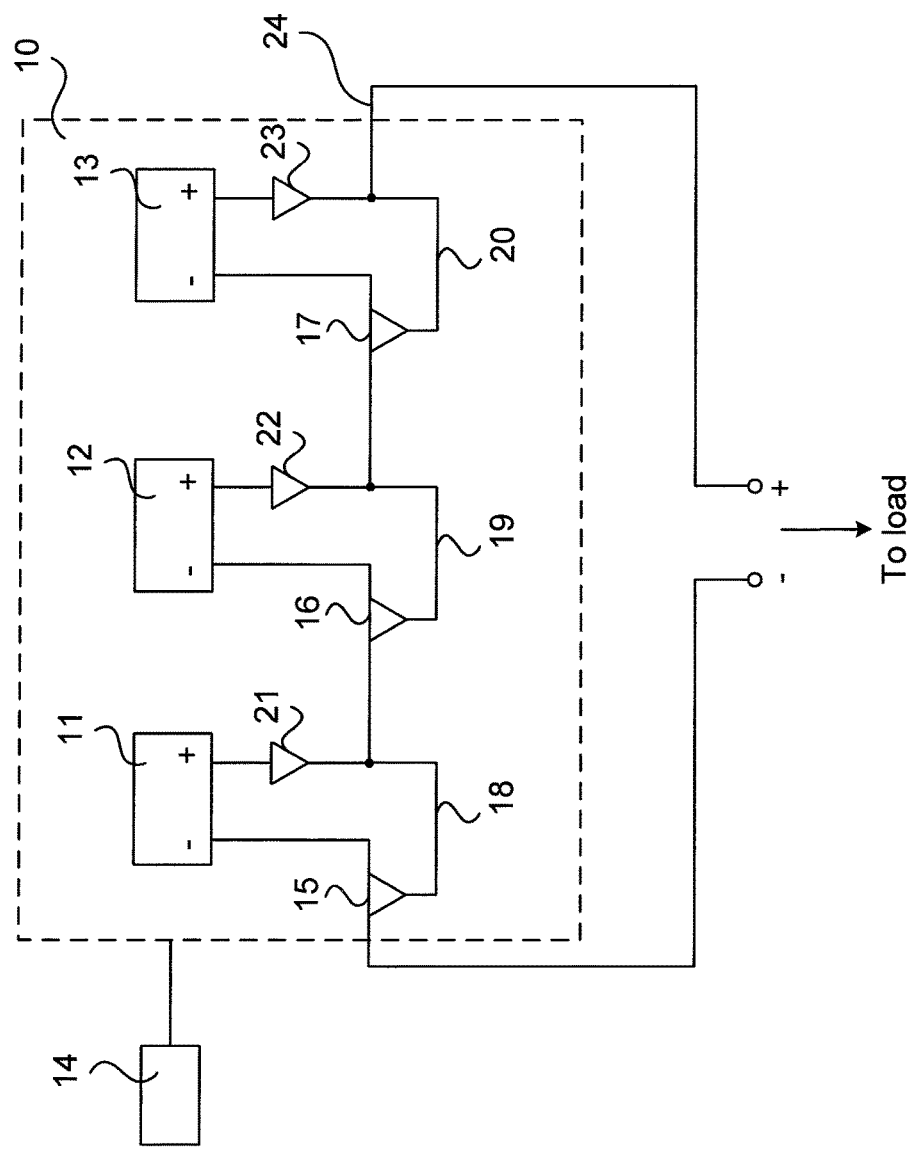
FIG. 1 illustrates an embodiment of an arrangement for disconnecting one or more battery modules of an automotive battery.

FIG. 1 illustrates an embodiment of an arrangement for disconnecting one or more battery modules of an automotive battery. An automotive battery 10 comprising three serially connected battery modules 11, 12, 13 is located in an electric or hybrid vehicle for delivering power to a load in the form of an electric motor (not shown). The arrangement comprises a device 14 arranged to detect that one or more battery modules are to be disconnected. This device 14 may be embodied in the form of an electronic control unit (ECU) as previously discussed, which typically is implemented by one or more microprocessors executing appropriate software for controlling various systems and components in the electric vehicle. The ECU 14 may detect that one or a multiple selection of the battery modules should be disconnected (for instance as a consequence of a vehicle crash or an internal failure during e.g. a charging event, dendrite formation, other types of internal shortage, etc.). In the following exemplifying embodiment, the ECU 14 is assumed to detect that the first battery module 11 for some reason is faulty and should be disconnected. The driver of the vehicle will still be able to move the car in spite of the reduced power delivery capacity of the battery 10.

A bypass switch 15, 16, 17 is arranged at each battery module and is controllable to bypass the respective battery module 11, 12, 13 via a bypass path 18, 19, 20. Hence, the ECU 14 detects that the first battery module 11 is faulty and should be disconnected. The ECU 14 send a control signal to the bypass switch 15 arranged at the first battery module 11 to close the bypass path 18. As previously mentioned, this may be performed by having a pyrotechnic charge move a bridging element upon ignition to close the bypass path 18 to the main power delivery line 24 of the automotive battery 10.

Further, a disconnect switch 21, 22, 23 is arranged at each battery module and is controllable to disconnect the respective battery module 11, 12, 13 from the remaining battery modules. Hence, after the ECU 14 has bypassed the first battery module 11, or simultaneously with the bypassing, it sends a control signal to the disconnect switch 21 to disconnect the first battery module 11. This may be performed by having a pyrotechnic switch break a conductive path between the positive terminal of the first battery module 11 and the main power delivery line 24 of the automotive battery 10. Since the potentially damaging current flows in the bypass path 18, a low-rated pyrotechnic switch can be used for disconnection.

Advantageously, as previously discussed, the detected battery module is bypassed and thereafter, the bypassed module is disconnected from the remaining battery modules in the automotive battery, or the bypassing and the disconnecting of the battery module is undertaken simultaneously. The bypassing of the detected battery module will have the kickback-current of the electric motor flow via the bypass path, and disconnection can be performed without the risk of causing arcing, thereby greatly improving the robustness of the battery. Further advantageous is that limited operation of the battery is provided such that a driver of the motor vehicle is given an opportunity to move her vehicle from a busy stretch of road or even drive the vehicle to a workshop.

Figure 2:
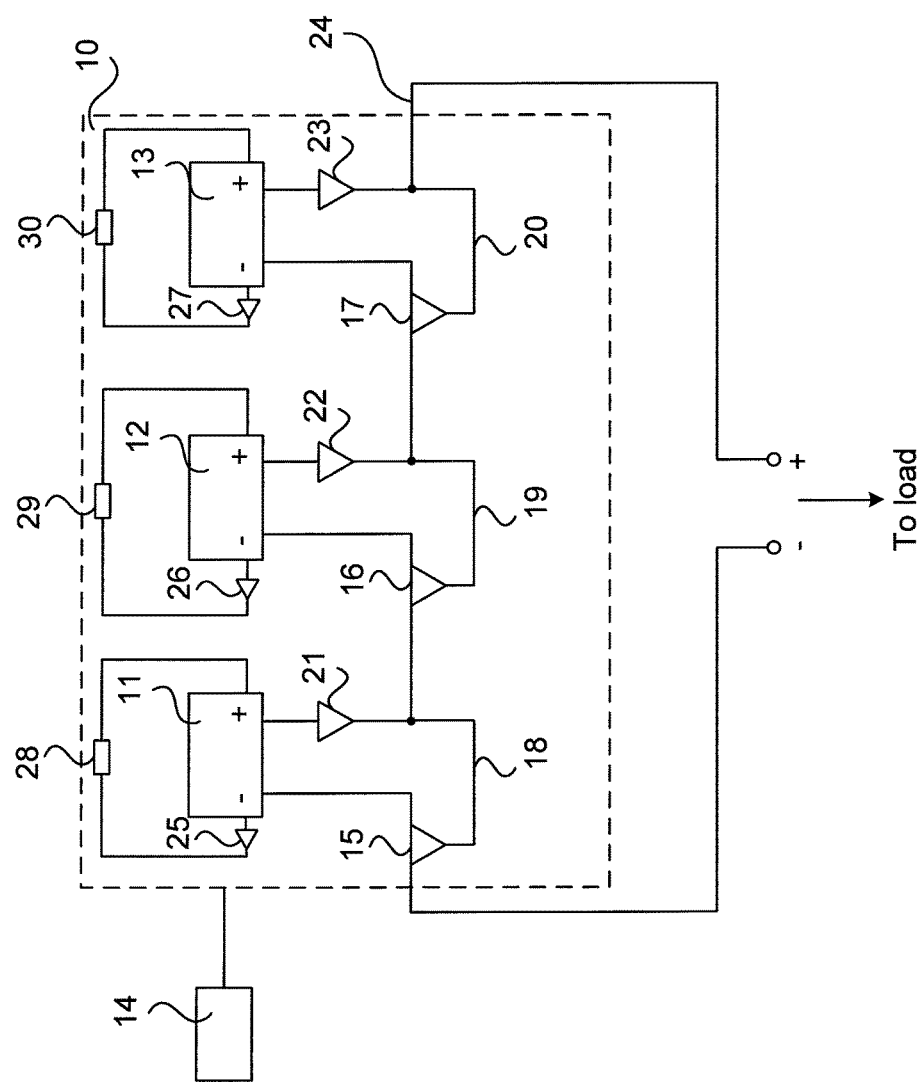
FIG. 2 illustrates a further embodiment of an arrangement for disconnecting one or more battery modules of an automotive battery.

FIG. 2 shows a further embodiment of an arrangement for disconnecting one or more battery modules of an automotive battery. In addition to the embodiment shown in FIG. 1, the arrangement further comprises a discharge switch 25, 26, 27 and an energy draining device 28, 29, 39 in the form of e.g. a resistor arranged at each battery module 11, 12, 13. The discharge switch 25, e.g. a pyrotechnical switch, arranged at a disconnected battery module 11 is controllable to couple the disconnected battery module 11 to the energy draining device 28 such that the module is discharged. Advantageously, a faulty battery module can be discharged in a lenient manner to avoid any further direct and/or delayed damage. Further, since only a battery module voltage in the range of 30-120 V (preferably below 60 V) remains, a low-rated pyro switch can be used.

Figure 3:
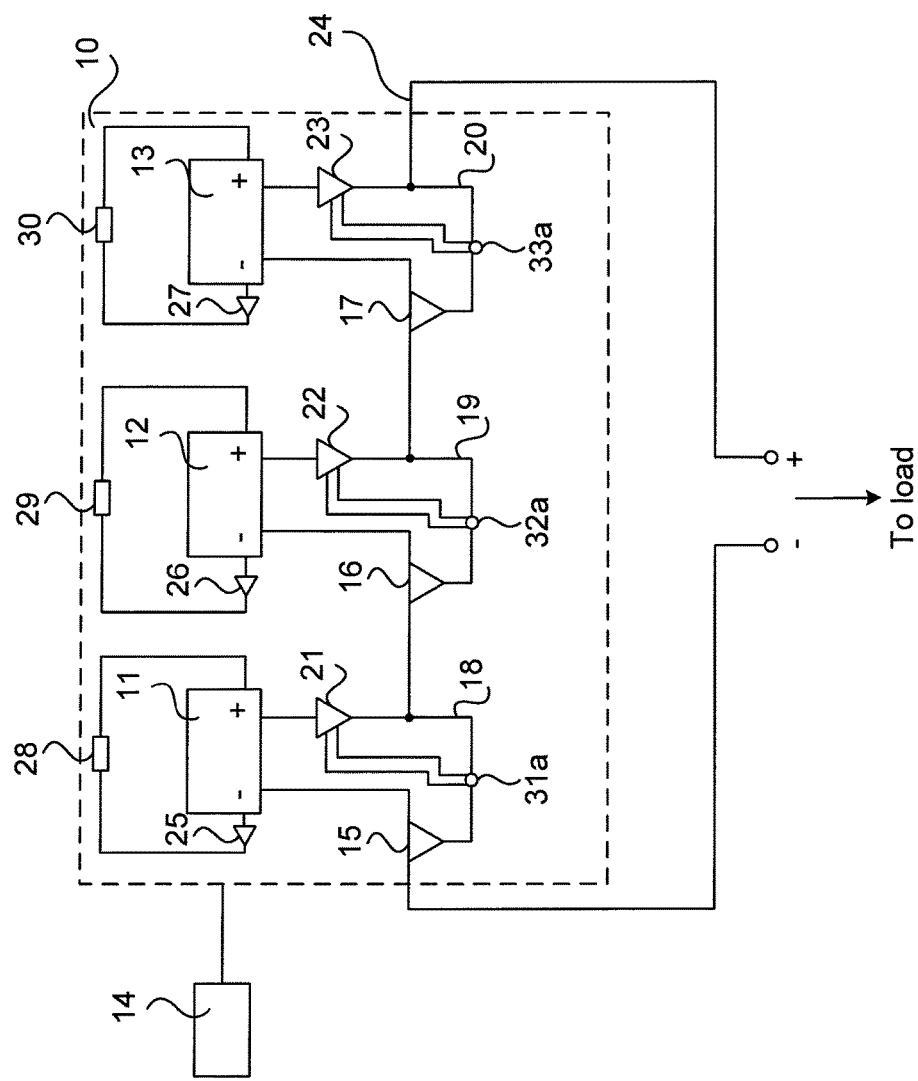
FIG. 3 illustrates yet a further embodiment of an arrangement for disconnecting one or more battery modules of an automotive battery.

FIG. 3 shows a further embodiment of an arrangement for disconnecting one or more battery modules of an automotive battery. In addition to the embodiment shown in FIG. 2, the arrangement further comprises current sensing means 31a, 32a, 33a realized by means of a coil arranged in the bypass path 18, 19, 20 of the respective battery module 11, 12, 13 and connected to the disconnect switch 21, 22, 23 of the respective battery module for controlling the disconnect switch. As soon as the coil 31a senses that the short-circuit current through the bypass path 18 reaches a predetermined level (vehicle and/or battery dependent; could reach e.g. 1000 A in a truck), it will respond accordingly and control the disconnect switch 21 to disconnect the bypassed battery module 11. Further, in an embodiment, each of the current sensing means 31a, 32a, 33a is coupled to the respective discharge switch 25, 26, 27 for activating the discharge switch simultaneously as, or after, activation of the disconnect switch.

The controlling of the disconnect switch 21 by means of the current sensing means 31a can be complemented with control signals from the ECU 14; in case the current flowing through the bypass path 18 is too low for the current sensing means 31a to react, the ECU could control the disconnect switch 21 to disconnect the battery module 11 from the main power delivery line 24 of the automotive battery 10.

Figure 4:
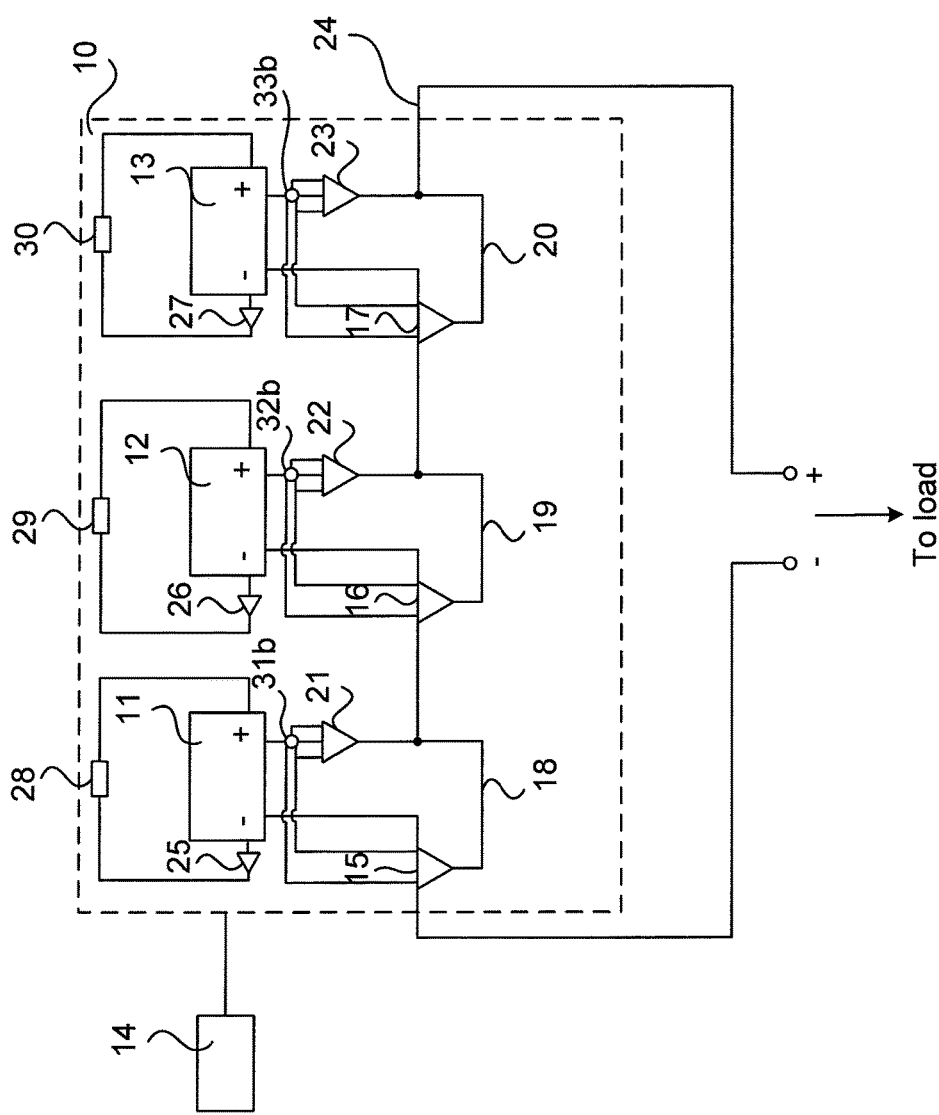
FIG. 4 shows an alternative embodiment to that illustrated in FIG. 3.

FIG. 4 shows an alternative embodiment to that illustrated in FIG. 3. In this alternative embodiment, the current sensing means 31b, 32b, 33b realized by means of coils are arranged at a terminal of the respective battery module 11, 12, 13 and connected to the bypass switch 15, 16, 17 of the respective battery module for controlling the bypass switch. As soon as the coil 31b senses that the current at a terminal (e.g. the positive terminal) of the battery module 11 reaches a predetermined level (vehicle and/or battery dependent), it will respond accordingly and control the bypass switch 21 to bypass the battery module 11 via the bypass path 18. Thus, in this particular embodiment, the respective coil 31b, 32b, 33b will advantageously act as a device for detecting that a battery module is to be disconnected.

In a further embodiment, each of the current sensing means 31b, 32b, 33b is coupled to the respective disconnect switch 21, 22, 23 for activating the disconnect switch simultaneously as, or after, activation of the bypass switch. When the coil 31b senses that the current at the positive terminal of the battery module 11 reaches the predetermined level, it will respond by controlling the disconnect switch 21 to disconnect the battery module 11 from the main power supply line 24 of the automotive battery 10 either simultaneously as, or after, the bypass switch 15 has been controlled by the coil 31b to bypass the battery module 11 via the bypass path 18.

In still a further embodiment, each of the current sensing means 31b, 32b, 33b is coupled to the respective discharge switch 25, 26, 27 for activating the discharge switch simultaneously as, or after, activation of the disconnect switch. Thus, the coil 31b will further control discharge of the battery module 11 via the discharge switch 25 to the energy draining device 28 when the coil 31b senses an over-current at the positive terminal of the battery module 31b.

An advantage of having the respective coil 31b, 32b, 33b control detection, bypass, disconnection and even discharge of the respective battery module 11, 12, 13 is that an ECU strictly not is required in the arrangement of the present invention. By using passive components (and not having to include a component such as a microprocessor), the arrangement for disconnecting one or more battery modules becomes inexpensive and less complex. Moreover, the arrangement will be easier to implement inside the automotive battery with passive components. Thus, the coils may act as a back-up to an ECU and/or a BMU, either operating independently from the ECU and/or BMU, or receiving control signals from the ECU/BMU. It can even envisaged that the coils 31b, 32b, 33b for controlling detection, bypass, disconnection and even discharge of the respective battery module 11, 12, 13 provide ECU functionality.

In yet another embodiment, the arrangement of the present invention further comprises a delay circuit (not shown) at each battery module 11, 12,13 for delaying the control signal transmitted to the respective bypass switch 15, 16, 17 and/or disconnect switch 21, 22 23 (and discharge switch 25, 26, 27). This delay circuit is preferably embodied by means of a passive component in the form of a capacitor, possibly supplemented with one or more resistors, in order to cause a delay of the control signal. This is advantageous in case disconnection is to be performed after bypassing. Further, by using passive components, the delay is completely autonomous. However, it is further possible that the control signal is delayed by one or more microprocessors (not shown) arranged locally at the automotive battery 10, or even by the ECU 14.

Thus, in case disconnection of e.g. the first battery module 11 is to be undertaken 1 ms after bypassing of the same has been performed, a delay circuit could be dimensioned such that a control signal of a sufficient magnitude reaches the disconnect switch 21 1 ms after it reaches the bypass switch 15. In case a microprocessor is used, more advanced control is facilitated.

Figure 5A:
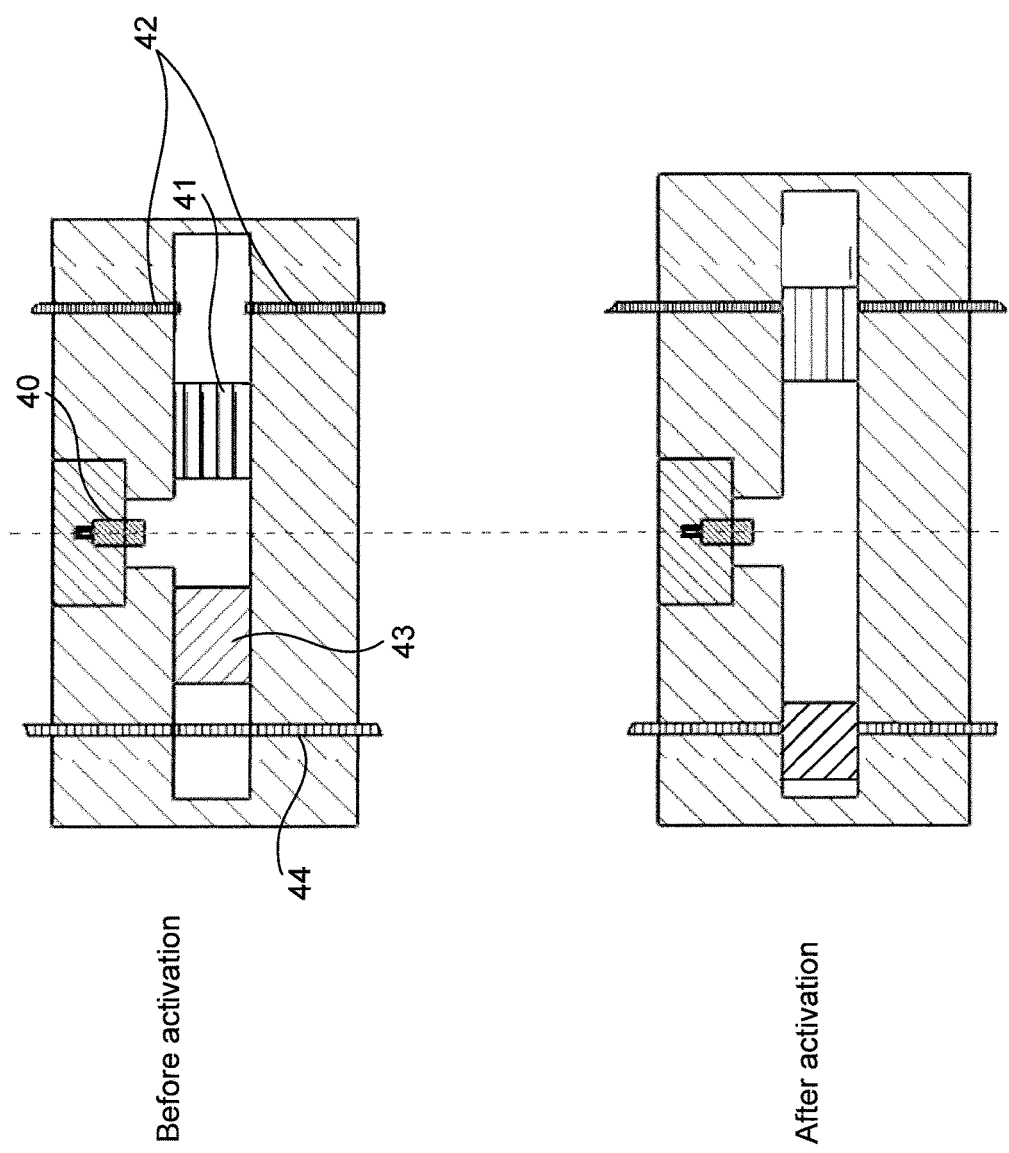
FIGS. 5a-b illustrate pyrotechnical switches according to embodiments of the present invention.
Figure 5B:
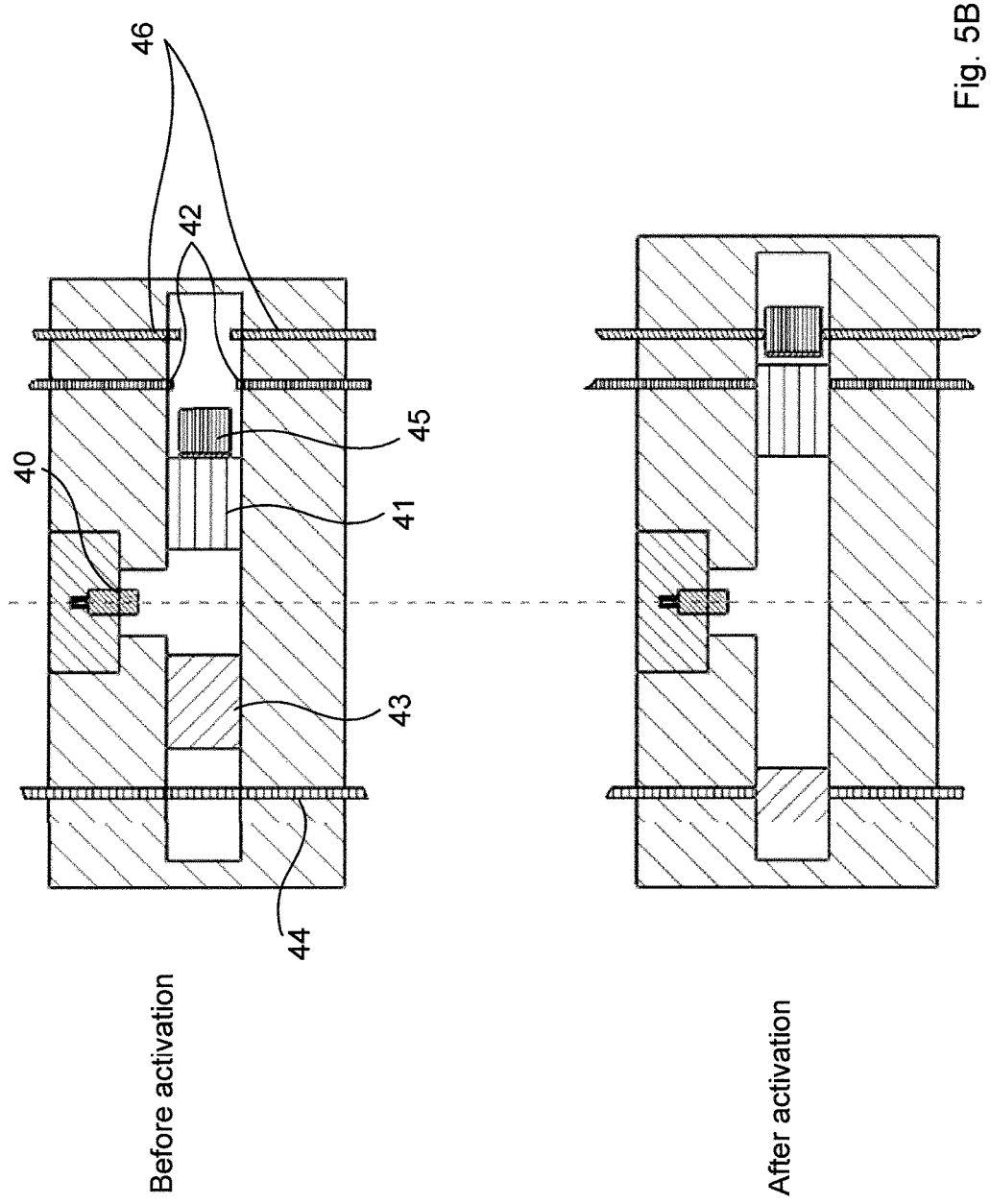

FIGS. 5a-b illustrate the pyrotechnical switches according to embodiments of the present invention previously discussed. FIG. 5a illustrates a pyrotechnical switch which combines connecting and disconnecting functionality. It is understood that pyrotechnical switches providing single functionality (connecting or disconnecting) can be used. However, such single functionality switches would each require their own charge for activation. The pyrotechnical switch of FIG. 5a comprises a pyrotechnical charge 40, which when ignited activates a piston-like movable bridging element 41 closing a first conductive path 42. Hence, the bridging element 41 is conductive. Simultaneously, upon ignition of the pyrotechnical charge 40 by the control signal, a piston-like movable breaking element 43 opens a second conductive path 44. The breaking element 43 is hence isolating. Thus, the bypass switch 15, 16, 17 at each battery module 11, 12, 13 may be embodied by the bridging element 41 and the first conductive path 42, while the disconnect switch 21, 22, 23 at each battery module may be embodied by the breaking element 43 and the second conductive path 44, and combined in the same housing for each battery module along with a single charge 40.

Advantageously, cutting or shearing is utilized when breaking the conductive path. In the art, disconnect switches are provided where conductors are bridged by a conducting element which is moved from one position to another to set the conductors in electrical connection with each other. These prior art disconnect switches are more sensitive with regard to physical tolerances and alignment of the conducting element with respect to the conductors, and are typically bulkier than the disconnect switch 21, 22, 23 proposed by embodiments of the present invention. Thus, the breaking element 43 advantageously cuts or shears the second conductive path 44 when set onto motion by the charge 40.

FIG. 5b illustrates a pyrotechnical switch where the bypass switch 15, 16, 17, the disconnect switch 21, 22, 23 and the discharge switch 25, 26, 27 for the respective battery module 11, 12, 13 are combined in the same housing. Thus, the pyrotechnical charge 40 activates a first movable bridging element 41 closing a first conductive path 42 upon ignition by the control signal for bypassing a battery module. Simultaneously, the movable breaking element 43 opens a second conductive path 44 for disconnecting the battery module. Further, a second movable bridging element 45 closes a third conductive path 46 for discharging the battery module.

As can be seen, a great number of combinations are possible for the pyrotechnical switches. An advantage of using a pyro element as compared to for instance fuses is that switching time is independent of the passing current, which implies instant switching.

In a further embodiment, switches in the form of relays can be used for any one of the bypass switches, disconnect switches and discharge switches, an advantage being e.g. that the switches can be selectably controlled to open and close (and subsequently to be closed and opened again). One or more disconnected modules could in that case be used as back-up in case these modules are functioning.

Figure 6:
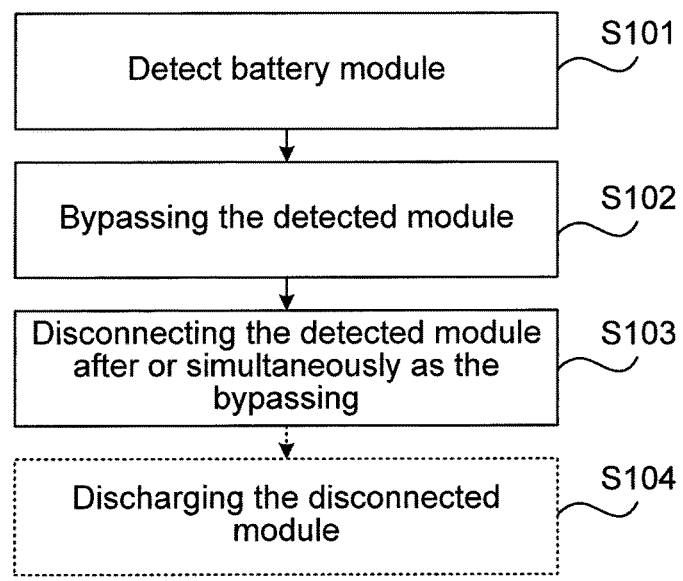
FIG. 6 shows a flowchart of a method of disconnecting one or more battery modules in an automotive battery according to an embodiment of the present invention.

FIG. 6 shows a flowchart of a method of disconnecting one or more battery modules in an automotive battery according to an embodiment of the present invention. In a first step S101, it is detected that one or more battery modules are to be disconnected. Then, in step S102, the at least one detected battery module is bypassed. Thereafter, in step S103, the at least one detected battery module is disconnected from remaining battery modules comprised in the automotive battery, either simultaneously as, or after, the bypassing. Hence, disconnection is performed no earlier than simultaneously as the bypassing.

Again with reference to FIG. 6, a further embodiment is indicated by step S104, where the detected battery module is discharged either simultaneously as, or after, the disconnection of the same. The vehicle can during this time be driven to a workshop if required.

Figure 7:
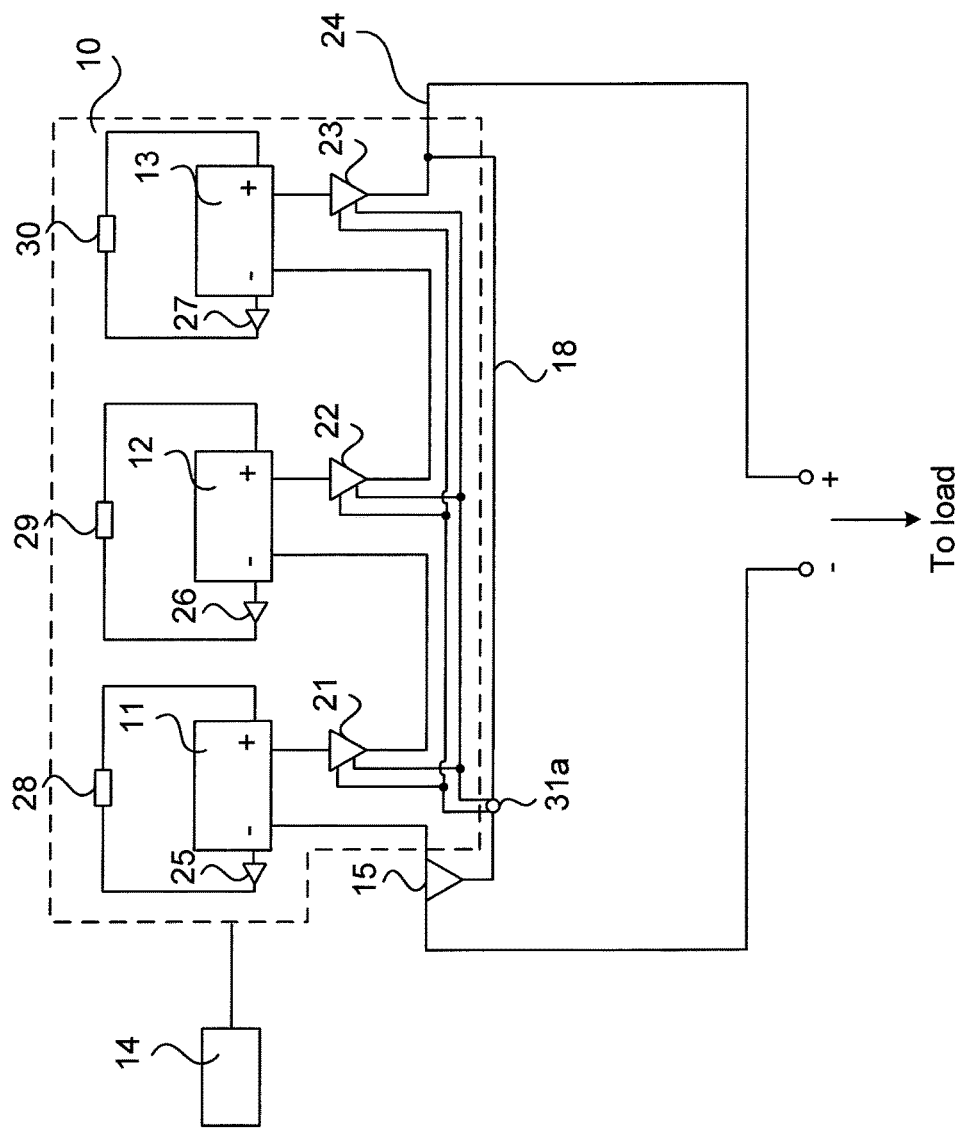
FIG. 7 shows an arrangement for bypassing all battery modules in an automotive battery according a further aspect of the present invention.

FIG. 7 shows an arrangement for bypassing all battery modules in an automotive battery according a further aspect of the present invention, where a single bypass switch is used to bypass all battery modules 11, 12, 13 from the main power delivery line 24 of the automotive battery 10 via a single bypass path 18. In case the battery modules only are to be disconnected in case of a more severe accident, thus warranting instant disconnection of all battery modules 11, 12, 13, the arrangement of FIG. 5 is advantageous in that only a single disconnect switch 15 is required for instantly bypassing all battery modules 11, 12, 13 via the bypass path 18. The single coil 31a senses the current in the bypass path 18 and controls the respective disconnect switch 21, 22, 23 to disconnect all battery modules either simultaneously as, or after, the bypassing. With this particular arrangement, the risk of having any undesired current generated e.g. when towing the vehicle can be eliminated. It should be noted that in this particular aspect, it may be advantageous to have the single bypass switch 15 and the bypass path 18 located outside the automotive battery 10 as it generally is a more inexpensive solution.

Figure 8:
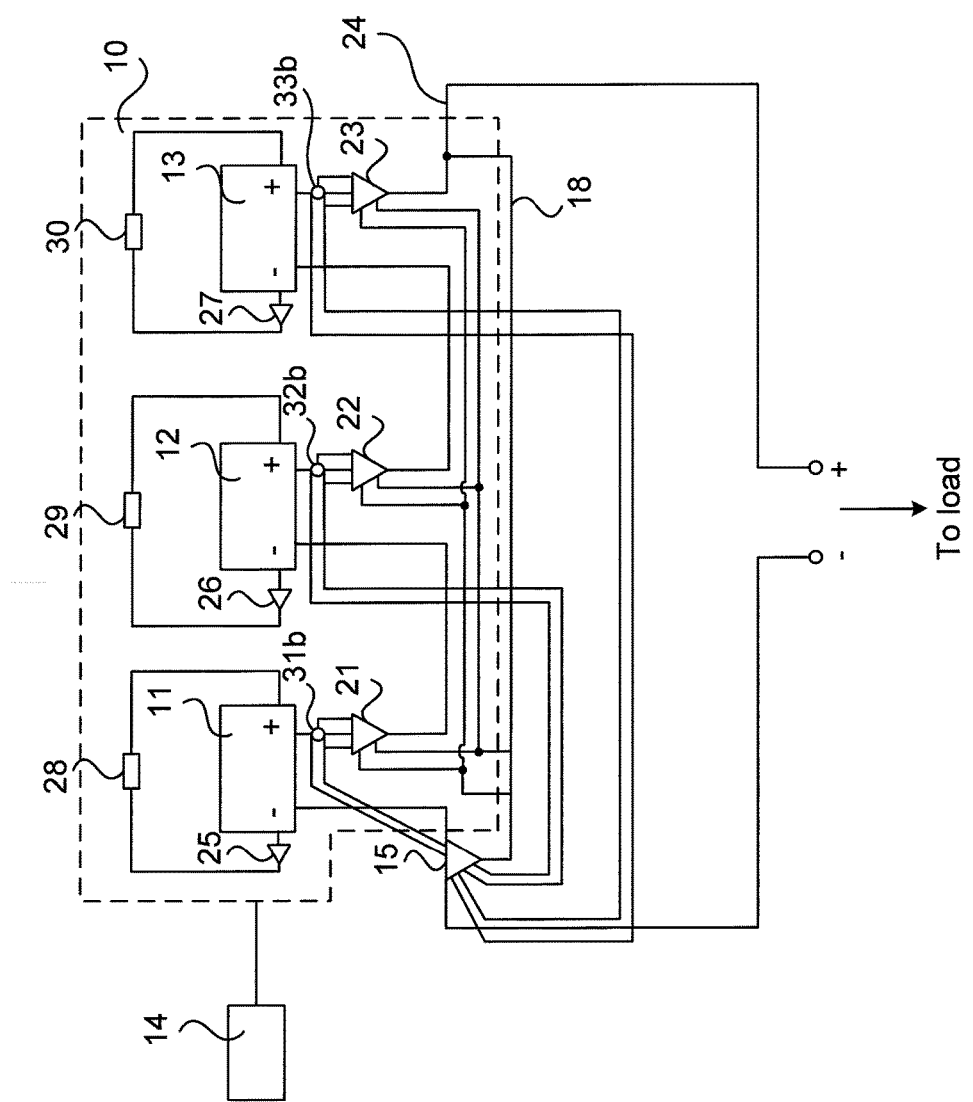
FIG. 8 shows an alternative arrangement for bypassing all battery modules in an automotive battery according the further aspect of the present invention.

The previously discussed embodiments of the present invention are applicable also to the arrangement of the third aspect of the invention. For instance, with reference to FIG. 8, a current sensing means 31b, 32b, 33b could be arranged at a terminal of the respective battery module 11, 12, 13 for sensing an over-current and signalling to the single bypass switch 15 (and possibly to the respective disconnect switch 21, 22, 23) that the battery modules should be disconnected.

Figure 9:
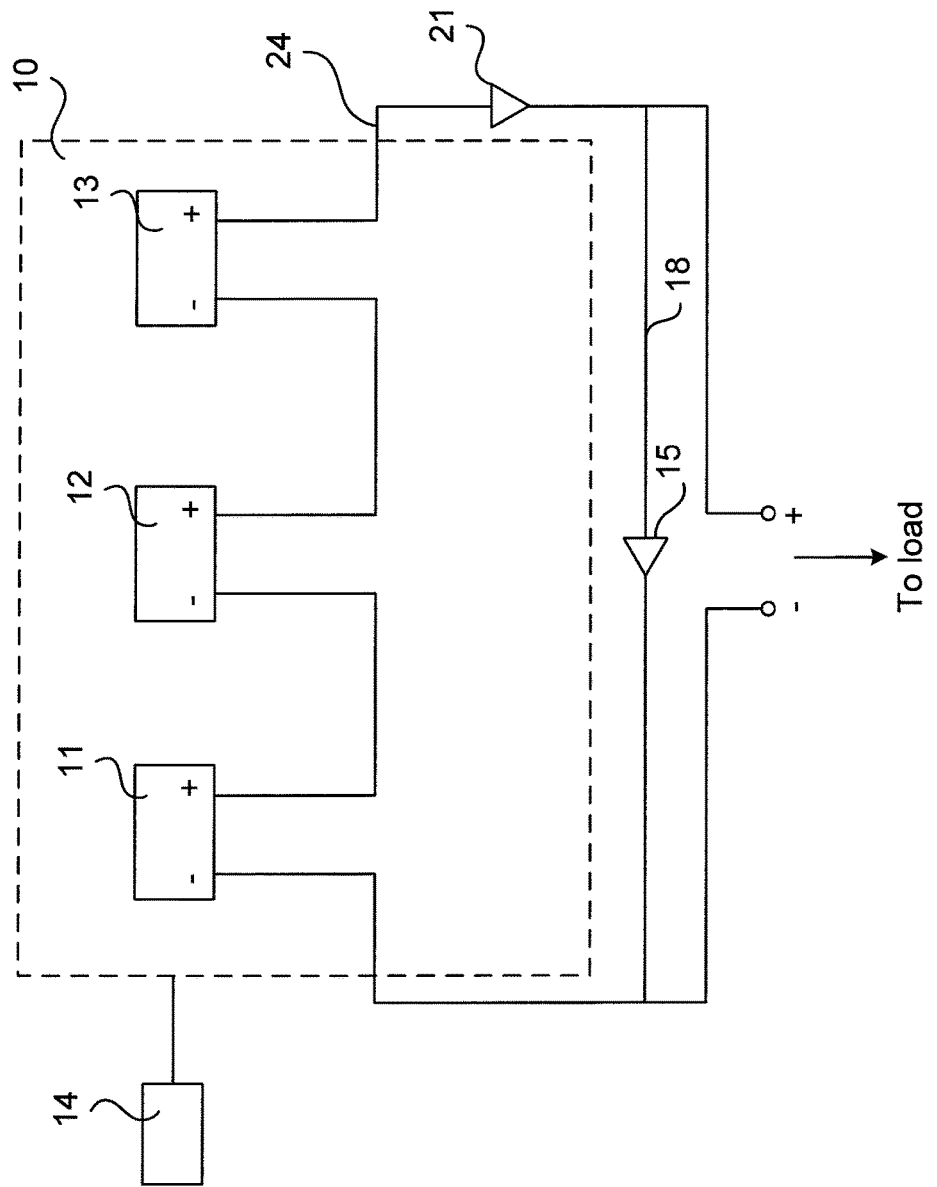
FIG. 9 shows yet an alternative arrangement for bypassing all battery modules in an automotive battery according to a fourth aspect of the present invention.

FIG. 9 shows an arrangement for bypassing all battery modules in an automotive battery according a fourth aspect of the present invention, where a single bypass switch 15 is used to bypass all battery modules 11, 12, 13 from the main power delivery line 24 of the automotive battery 10 via a single bypass path 18 (and thus from the load). In case the battery modules only are to be disconnected in case of a more severe accident, thus warranting instant disconnection of all battery modules 11, 12, 13, the arrangement of FIG. 9 is advantageous in that only a single bypass switch 15 is required for instantly bypassing all battery modules 11, 12, 13 via the bypass path 18. Further advantageous is that a single disconnect switch 21 is arranged in the main power delivery line 24, which single disconnect switch 21 disconnects all the battery modules from the bypass path 18 either simultaneously as, or after, the bypassing of the battery modules.

As in previous embodiments, a single coil or any other appropriate sensing device (not shown) may sense the current in the bypass path 18 and controls the single disconnect switch 21 to disconnect all battery modules. With this arrangement, the risk of having any undesired current generated e.g. when towing the vehicle can be eliminated. It should be noted that in this fourth aspect, it may be advantageous to have the single bypass switch 15 and the bypass path 18 as well as the single disconnect switch 21 located outside the automotive battery 10 as it generally is a more inexpensive solution. Moreover, as has been described in previous embodiments, the single disconnect switch 21 may be arranged to receive a control signal from the ECU 14 for disconnecting the battery modules 11, 12, 13, or from current sensing means such as 31b, 32b, 33b (not shown in FIG. 9).

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of disconnecting at least one battery module of a plurality of battery modules in an automotive battery, the method comprising:
    detecting the at least one detected battery module is to be disconnected;
    bypassing the at least one detected battery module to be disconnected; and
    disconnecting the at least one detected battery module from remaining battery modules comprised in the automotive battery no earlier than simultaneous to bypassing of the at least one detected battery module.

2. The method according to claim 1, further comprising:
    discharging the at least one detected battery module no earlier than simultaneously as the disconnection of the at least one detected battery module.

3. The method according to claim 1, further comprising:
    indicating to a user of the battery that the at least one detected battery module is disconnected.

4. The method according to claim 1, further comprising igniting a pyrotechnical charge to activate a piston-like movable bridging element to close a first conductive path for the at least one detected battery module and to activate a piston-like movable breaking element to open a second conductive path for the at least one detected batter module.

5. An arrangement for disconnecting at least one battery module of a plurality of battery modules in an automotive battery, the arrangement comprising:
    a device arranged to detect that at least one detected battery module is to be disconnected;
    a bypass switch arranged at each battery module, the bypass switch arranged at the at least one detected battery module being controllable to bypass the at least one detected battery module via a bypass path; and
    a disconnect switch arranged at each battery module, the disconnect switch arranged at the at least one detected battery module being controllable to disconnect the at least one detected battery module from remaining battery modules no earlier than simultaneously to bypassing of the at least one detected battery module such that the at least one detected battery module is at least one bypassed battery module.

6. The arrangement according to claim 5, further comprising:
    a discharge switch and an energy draining device arranged at each battery module, the discharge switch arranged at the at least one detected battery module being controllable to couple the at least one detected battery module to the energy draining device for discharging of the at least one detected battery module no earlier than simultaneously as the disconnection of the at least one detected battery module.

7. The arrangement according to claim 6, further comprising:
    current sensing means arranged at each battery module for sensing a current in the bypass path of the at least one bypassed battery module, the current sensing means for sensing a current being arranged to control the disconnect switch to disconnect the at least one bypassed battery module when the current in the bypass path has reached a predetermined threshold level, the current sensing means is arranged to control the discharge switch to discharge the at least one battery module to be disconnected when the current at a terminal of the at least one battery module has reached the predetermined threshold level.

8. The arrangement according to claim 6, wherein the discharge switches are pyrotechnical switches arranged to couple the disconnected battery modules to the energy draining devices upon ignition of a pyrotechnical charge by causing a second movable bridging element arranged at the pyrotechnical charge to move to a position where the second bridging element closes a circuit between the battery module and the energy draining device.

9. The arrangement according to claim 8, wherein at least two of the bypass switch, the disconnect switch and the discharge switch at the respective battery module are combined in the same housing and uses the same pyrotechnical charge for ignition.

10. The arrangement according to claim 5, further comprising:
    current sensing means arranged at each battery module for sensing a current in the bypass path of the at least one bypassed battery module, the current sensing means for sensing a current being arranged to control the disconnect switch to disconnect the at least one bypassed battery module when the current in the bypass path has reached a predetermined threshold level.

11. The arrangement according to claim 10, wherein the current sensing means arranged at each battery module for sensing a current is a coil.

12. The arrangement according to claim 5, further comprising:
    current sensing means arranged at each battery module for sensing a current at a terminal of the at least one battery module to be disconnected, the current sensing means arranged to control the bypass switch to bypass the at least one battery module to be disconnected when the current at the terminal has reached a predetermined threshold level.

13. The arrangement according to claim 12, wherein:
    the current sensing means arranged at each battery module is arranged to control the disconnect switch to disconnect the at least one battery module to be disconnected when the current at the terminal has reached the predetermined threshold level.

14. The arrangement according to claim 5, wherein the disconnect switch is arranged to receive a control signal from an electronic control unit of a motor vehicle in which the automotive battery is arranged, for disconnecting the at least one detected battery module.

15. The arrangement according to claim 14, wherein the disconnecting switches are pyrotechnical switches arranged to disconnect the battery modules upon ignition by the control signal of a pyrotechnical charge by causing a movable breaking element arranged at the pyrotechnical charge to move to a position where the breaking element breaks a connection between the respective battery module and a main power delivery line of the automotive battery.

16. The arrangement according to claim 14, wherein the bypass switches are pyrotechnical switches arranged to close a bypass path upon ignition by the control signal of a pyrotechnical charge by causing a first movable bridging element arranged at the pyrotechnical charge to move to a position where the first bridging element closes the bypass path to the main power delivery line of the automotive battery.

17. The arrangement according to claim 5, further comprising:
a delay circuit arranged at each battery module to delay a control signal to one or more of the respective bypass switches, disconnect switches and discharge switches.

18. The arrangement according to claim 5, further comprising:
a pyrotechnical charge;
a piston-like movable bridging element movable in response to ignition of the pyrotechnical charge to close a first conductive path for the at least one detected battery module; and
a piston-like movable breaking element movable in response to ignition of the pyrotechnical charge to open a second conductive path for the at least one detected batter module.

19. An arrangement for disconnecting all battery modules of a plurality of battery modules in an automotive battery, the arrangement comprising:
a device arranged to detect detected battery modules to be disconnected;
a bypass switch arranged at the automotive battery controllable to bypass the battery modules via a bypass path; and
a disconnect switch arranged at a location selected from a group consisting of each battery module and a main power delivery line, the disconnect switch arranged at the respective battery module being controllable to disconnect the respective battery module from a main power delivery line of the automotive battery no earlier than simultaneously to bypassing of the battery modules.

20. The arrangement for disconnecting all battery modules of a plurality of battery modules according to claim 19, wherein a disconnect switch is arranged at each battery module.

21. The arrangement for disconnecting all battery modules of a plurality of battery modules according to claim 19, wherein the disconnect switch is arranged at the main power delivery line.

22. The arrangement according to claim 19, further comprising:
a pyrotechnical charge;
a piston-like movable bridging element movable in response to ignition of the pyrotechnical charge to close a first conductive path for the battery modules; and
a piston-like movable breaking element movable in response to ignition of the pyrotechnical charge to open a second conductive path for the battery modules.

* * * * *